(12) United States Patent
Ko et al.

(10) Patent No.: US 11,921,801 B2
(45) Date of Patent: Mar. 5, 2024

(54) ELECTRONIC APPARATUS AND KEYWORD MANAGEMENT METHOD THEREOF

(71) Applicant: Coupang Corp., Seoul (KR)

(72) Inventors: Hun Min Ko, Seoul (KR); Seung Yong Baek, Seoul (KR); Binna Kim, Seoul (KR)

(73) Assignee: Coupang Corp., Seoul (KR)

( * ) Notice: Subject to any disclaimer, the term of this patent is extended or adjusted under 35 U.S.C. 154(b) by 195 days.

(21) Appl. No.: 17/386,922

(22) Filed: Jul. 28, 2021

(65) Prior Publication Data

US 2022/0327169 A1 Oct. 13, 2022

(30) Foreign Application Priority Data

Apr. 9, 2021 (KR) .................. 10-2021-0046427

(51) Int. Cl.
*G06F 16/90* (2019.01)
*G06F 16/953* (2019.01)

(52) U.S. Cl.
CPC .................. *G06F 16/953* (2019.01)

(58) Field of Classification Search
CPC ............................ G06F 16/953; G06F 16/9566
See application file for complete search history.

(56) References Cited

U.S. PATENT DOCUMENTS

| | | | | |
|---|---|---|---|---|
| 7,730,021 | B1 * | 6/2010 | Morse | G06F 16/951 705/64 |
| 9,002,887 | B1 | 4/2015 | Herrmann et al. | |
| 2010/0161605 | A1 | 6/2010 | Gabrilovich et al. | |
| 2012/0177189 | A1 | 7/2012 | Chatterjee et al. | |
| 2016/0132901 | A1 * | 5/2016 | Davar | G06F 16/24578 705/7.29 |
| 2018/0018304 | A1 * | 1/2018 | Pritchard | G06F 40/143 |
| 2019/0287155 | A1 | 9/2019 | Park | |
| 2020/0082487 | A1 | 3/2020 | Kishikawa et al. | |
| 2020/0242147 | A1 | 7/2020 | Agrawal et al. | |
| 2021/0034690 | A1 * | 2/2021 | Kim | G06F 16/906 |
| 2021/0256637 | A1 * | 8/2021 | Bendt | G06Q 10/025 |

FOREIGN PATENT DOCUMENTS

| | | | | |
|---|---|---|---|---|
| CN | 108121727 A | * | 6/2018 | ......... G06F 16/9566 |
| JP | 2001225915 A | | 8/2001 | |
| JP | 2019112226 A | | 7/2019 | |
| JP | 2020042354 A | | 3/2020 | |

(Continued)

OTHER PUBLICATIONS

Machine Translation of KR 20190074830, by Choi, Published on Jun. 28, 2019 (Year: 2019).*

*Primary Examiner* — Mahesh H Dwivedi
(74) *Attorney, Agent, or Firm* — Banner & Witcoff, Ltd.

(57) ABSTRACT

Provided is a keyword management method of an electronic apparatus. The keyword management method may include confirming a landing page type corresponding to a keyword associated with a search service of another apparatus, checking whether the keyword corresponds to a keyword set, changing the landing page type corresponding to the keyword when the keyword corresponds to the keyword set and the confirmed landing page type is not a landing page type related to the keyword set, and providing information on the changed landing page type to the other apparatus.

13 Claims, 10 Drawing Sheets

(56) References Cited

FOREIGN PATENT DOCUMENTS

| KR | 101153307 | B1 | 6/2012 | |
|---|---|---|---|---|
| KR | 101180439 | B1 | 9/2012 | |
| KR | 101767223 | B1 | 8/2017 | |
| KR | 1020190074830 | A | 6/2019 | |
| KR | 1020190107990 | A | 9/2019 | |
| WO | WO-2017197430 | A1 * | 11/2017 | ......... G01N 21/5911 |

* cited by examiner

ELECTRONIC APPARATUS AND KEYWORD MANAGEMENT METHOD THEREOF

RELATED APPLICATION INFORMATION

The present application claims priority to and the benefit of Korean Patent Application No. 10-2021-0046427 filed on Apr. 9, 2021, and is incorporated by reference herein in its entirety.

TECHNICAL FIELD

The present disclosure relates to an electronic apparatus for changing information related to a keyword included in a dataset provided to a search engine on the basis of whether a keyword input to a search engine by a user corresponds to a keyword set, and a keyword management method thereof.

DESCRIPTION OF THE RELATED ART

Users may enter keywords into search engines such as Google and Naver to search for related information, and electronic apparatuses for providing services may determine whether to bid for keywords in order to expose related information according to the search of the search engine. For example, when an electronic apparatus determines to bid for a keyword and a user enters the corresponding keyword into a search engine, a service provided by the electronic apparatus may be displayed as related information corresponding to the search. In this case, the user may confirm the related information to access the service provided by the electronic apparatus, and the electronic apparatus pays a predetermined fee to the search engine. Alternatively, when an electronic apparatus does not bid for a keyword, the electronic apparatus may not pay a fee to the search engine regardless of whether the user enters the corresponding keyword into the search engine. In such a situation, electronic apparatuses need a technology capable of reducing unnecessary expenditures and setting information related to a keyword by providing information more suitable for the keyword in order to improve user satisfaction with service use.

DISCLOSURE OF THE INVENTION

Example embodiments disclose an electronic apparatus and a keyword management method thereof. However, the technical challenges to be achieved by these example embodiments are not limited to the above-mentioned technical challenges, and other technical challenges may be inferred from the following example embodiments.

According to a first example embodiment, there is provided a keyword management method of an electronic apparatus related to a service, the keyword management method including confirming a landing page type corresponding to a keyword associated with a search service of another apparatus, checking whether the keyword corresponds to a keyword set, changing the landing page type corresponding to the keyword when the keyword corresponds to the keyword set and the confirmed landing page type is not a landing page type related to the keyword set, and providing information on the changed landing page type to the other apparatus.

According to an example embodiment, the keyword may include a dataset provided from the electronic apparatus to the other apparatus, and the landing page type may correspond to at least one of a first landing page type related to an item search result page and a second landing page type related to a travel search result page.

According to an example embodiment, the changing of the landing page type may include changing the landing page type related to the keyword from the first landing page type to the second landing page type when the landing page type corresponding to the keyword confirmed based on the dataset is the first landing page type.

According to an example embodiment, a page corresponding to the second landing page type may have a different domain from that of a page corresponding to the first landing page type.

According to an example embodiment, the checking of whether the keyword corresponds to a keyword set may include checking whether the keyword is included in the keyword set.

According to an example embodiment, wherein the changing of the landing page type corresponding to the keyword may include changing information related to the keyword included in the dataset on the basis of the number of search results of the keyword for the landing page type related to the keyword set in the service.

According to an example embodiment, the changing of information related to the keyword may include setting a state of the keyword included in the dataset to "off" when the number of search results is 0. When the state of the keyword is set to "off," exposure of a search result for the service corresponding to the keyword may be omitted in a search service of the other apparatus.

According to an example embodiment, the changing of the landing page type corresponding to the keyword may include deleting information corresponding to the keyword from the dataset when the number of search results of the keyword for the landing page type related to the keyword set in the service is 1 or more, and matching the keyword with the landing page type related to the keyword set and registering the keyword matched with the landing page type in the dataset.

According to an example embodiment, the changing of the landing page type corresponding to the keyword may include changing the landing page type matched with the keyword in the dataset from the first landing page type to the second landing page type and setting a state of the keyword to "on" when the number of search results of the keyword for the landing page type related to the keyword set in the service is 1 or more. When the state of the keyword is set to "on," a search result for the service corresponding to the keyword may be exposed in a search service of the other apparatus.

According to an example embodiment, the dataset and the keyword set related to the electronic apparatus may be updated at different intervals.

According to an example embodiment, the keyword set may correspond to a set of keywords related to travel.

According to an example embodiment, the keyword management method may include determining whether to inquire about the number of search results of an item corresponding to the keyword in the service on the basis of a preset condition when the keyword does not correspond to the keyword set and updating information related to the dataset on the basis of the number of search results when the number of search results is inquired about.

According to an example embodiment, the updating may include updating a state of the keyword and the landing page type by checking a black list and whether a product is sold out on the basis of the keyword when the number of search results is 0.

According to a second example embodiment, there is provided an electronic apparatus including a communication device and a controller configured to check a landing page type corresponding to a keyword associated with a search service of another apparatus, check whether the keyword corresponds to a keyword set, and change the landing page type corresponding to the keyword when the keyword corresponds to the keyword set and the confirmed landing page type is not a landing page type related to the keyword set.

According to a third example embodiment, there is provided a computer-readable recording medium including a non-transitory recording medium having a program recorded thereon to cause a computer to execute the above method.

Specific details of other example embodiments are included in the detailed description and drawings.

According to the present disclosure, an electronic apparatus can change a landing page type and provide related information to a search engine on the basis of whether a keyword corresponds to a keyword set. In this case, the landing page type can be changed in order to improve user convenience by providing information more suitable for a keyword entered by a user. Also, by updating a dataset provided to a search engine, it is possible to reduce unnecessary expenditures. In addition, the electronic apparatus can efficiently provide related services by analyzing a user's pattern according to the landing page type.

Effects of the present disclosure are not limited to the aforementioned effects, and other effects which are not mentioned here can be clearly understood by those skilled in the art from the appended claims.

DETAILED DESCRIPTION OF THE INVENTION

The terms used herein have been selected as general terms which are widely used at present in consideration of the functions of the present disclosure but may be altered according to the intent of an operator skilled in the art, conventional practice, or introduction of new technology. In addition, specific terms have been arbitrarily selected by the applicant and their meanings will be described in detail in the corresponding sections. Therefore, the terms used herein should be defined on the basis of the overall content of the present disclosure instead of simply the names of the terms.

Throughout the specification, when a part is referred to as including a certain element, this means that the part may include other elements rather than excluding other elements unless otherwise stated. Also, terms such as "-er," "-or," and "module" used herein refer to an element for performing at least one function or operation and may be implemented with hardware, software, or a combination thereof.

An expression "at least one of a, b, and c" used herein may encompass "only a," "only b," "only c," "a and b," "a and c," "b and c," or "all of a, b, and c."

The term "terminal" mentioned below may be implemented as a computer or portable terminal that can access a server or another terminal over a network. Here, a computer may include, for example, a notebook, a desktop, a laptop, and the like which are equipped with a web browser, and a portable terminal may be, for example, a wireless communication apparatus that guarantees portability and mobility and may include any kind of handheld-based wireless communication apparatus such as a terminal, a smartphone, and a tablet PC that are based on communication such as International Mobile Telecommunication (IMT), Code Division Multiple Access (CDMA), W-Code Division Multiple Access (W-CDMA), and Long Term Evolution (LTE).

Hereinafter, example embodiments of the present disclosure will be fully described with reference to the accompanying drawings in such a way that those skilled in the art can easily carry out the example embodiments. The disclosure may, however, be embodied in many different forms and should not be construed as being limited to the example embodiments set forth herein.

Hereinafter, the example embodiments of the present disclosure will be described in detail with reference to the accompanying drawings.

Figure 1:
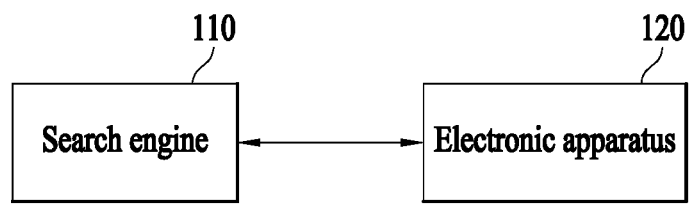
FIG. 1 shows a system according to an example embodiment.

FIG. 1 shows a system according to an example embodiment.

Referring to FIG. 1, the system may include a search engine 110 and an electronic apparatus 120. In the system shown in FIG. 1, only elements related to this example embodiment are shown. Therefore, it can be understood by those skilled in the art that general-purpose elements other than the element shown in FIG. 1 may be further included.

The search engine 110 and the electronic apparatus 120 may communicate with each other over a network. The network includes a local area network (LAN), a wide area network (WAN), a value added network (VAN), a mobile radio communication network, a satellite communication network, and a combination thereof and is a data communication network in a comprehensive sense that enables the network members shown in FIG. 1 to smoothly communicate with each other. The network may include a wired Internet, a wireless Internet, and a mobile wireless communication network. The wireless communication may be, for example, wireless LAN (Wi-Fi), Bluetooth, Bluetooth Low Energy (BLE), Zigbee, Wi-Fi Direct (WFD), Ultra Wideband (UWB), Infrared Data Association (IrDA), Near Field Communication (NFC), and the like, but the present disclosure is not limited thereto.

The search engine 110 is an engine implemented in another apparatus and may include, for example, search engines such as Google and Naver. A user may enter a word into the search engine 110 to search for related information.

Through a link displayed according to the search, the screen may be switched to a page that provides a service. In this case, the electronic apparatus that provides a service may provide a dataset to the search engine such that the dataset can be exposed to the search of the search engine according to a word entered by the user.

The dataset may include information on at least one keyword that is provided from the electronic apparatus 120 to the search engine 110 at regular intervals. For example, the electronic apparatus 120 may provide a dataset including information on keywords 1 to N to the search engine. When the user enters keyword 1 into the search engine 110, the search engine may display a link as a search advertisement for keyword 1 on the basis of the dataset. Accordingly, when the user accesses the service provided by the electronic apparatus using the displayed link, the electronic apparatus 120 may pay a fee to the search engine 110 on the basis of the number of times the user accesses the service through the link.

In this case, the dataset may include not only a keyword but also information on the state and the landing page type of the keyword. Here, the state information of the keyword is on/off information of the keyword. For example, when keyword 1 is "off," the electronic apparatus 120 may not pay a fee to the search engine 110 even though the user enters keyword 1 into the search engine 110. When keyword 1 is "on," the electronic apparatus 120 may pay a fee to the search engine 110 on the basis of the number of times when the user enters keyword 1 into the search engine 110.

Also, the electronic apparatus 120 may determine a landing page type corresponding to the keyword and provide a dataset including related information to the search engine 110. Each landing page type may have a different domain, and each domain may provide a user with optimal information suitable for a keyword. For example, the electronic apparatus 120 may determine a landing page type corresponding to keyword 1 as a search result page and may provide a dataset including the search result page to the search engine 110. When the user enters keyword 1 and accesses the service provided by the electronic apparatus through an exposed link, in order to provide optimal information suitable for keyword 1, the landing page type corresponding to keyword 1 may be a search result page. As another example, the electronic apparatus 120 may determine a landing page type corresponding to keyword 2 as a travel search result page and may provide a dataset including the travel search result page to the search engine 110. When the user enters keyword 2 and accesses the service provided by the electronic apparatus through an exposed link, the landing page type corresponding to keyword 2 in order to provide optimal information suitable for keyword 2 may be a travel search result page. In addition, the landing page type may further include a product detail page and a search detail page.

The electronic apparatus 120 that provides the service may provide a determined dataset to the search engine 110 at regular intervals. The electronic apparatus 120 may analyze the user's pattern for each landing page type through the link displayed in the search engine 110 and may update the dataset utilizing the analyzed information.

A specific process performed by the search engine 110 and the electronic apparatus 120 will be described below in relation to keyword setting.

Figure 2:
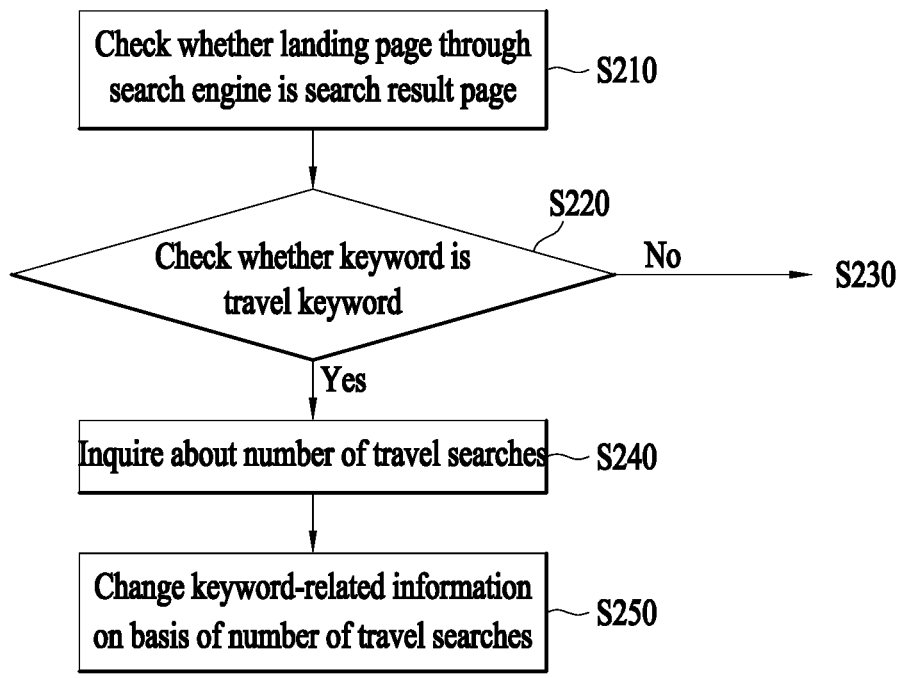
FIG. 2 shows an example embodiment of a keyword management method performed by an electronic apparatus.

FIG. 2 shows an example embodiment of a keyword management method performed by an electronic apparatus.

Referring to FIG. 2, in operation S210, the electronic apparatus may check whether a landing page through a search engine is a search result page (hereinafter also referred to as SRP). The electronic apparatus may provide a dataset to the search engine. Also, the dataset may include a keyword, a landing page type associated with the keyword, and information on on/off. Here, the landing page type may include at least one of a first landing page, which is a search result page related to an item, and a second landing page, which is a travel search result page. Specifically, the search result page is a page including information related to a search result corresponding to a keyword entered into the search engine and may be a page including the number of search results and brief search information. On the other hand, the travel search result page, which is a page including information related to a travel search result corresponding to a travel keyword, may be a page including the number of travel search results and travel search information. In this case, the first landing page and the second landing page are pages having different domains. The first landing page may be a page including search information for products as a search result, and the second landing page may be a page including information on travels in a separate domain as a search result. As described above, the travel-related information may be provided in a separate domain different from that of products. Therefore, it is possible to improve customer service utilization.

When a keyword entered by the user into a search engine implemented in another apparatus is included in the dataset, the screen may be switched to a landing page associated with the keyword through a link provided by the search engine. In this case, the landing page is a page including content related to the service provided by the electronic apparatus. It is possible to improve user reliability by inducing screen switching to a page more suitable for the keyword for the user. For example, when keyword A entered by the user to the search engine is included in the dataset and keyword A is associated with a search result page, the electronic apparatus may switch the screen to the search result page associated with keyword A through the link provided by the search engine. Alternatively, when keyword A is associated with a travel search result page, the electronic apparatus may switch the screen to the travel search result page associated with keyword A through the link provided by the search engine. When keyword A is not included in the dataset, the electronic apparatus may provide a screen including general information to the user who accesses the service through the link provided by the search engine.

In operation S220, the electronic apparatus may check whether a keyword is a travel keyword. Specifically, the electronic apparatus may check whether the keyword included in the dataset provided to the search engine is included in a keyword set associated with the electronic apparatus. When the keyword included in the dataset is included in the keyword set, the electronic apparatus may determine that the corresponding keyword is a travel keyword. When the keyword included in the dataset is not included in the keyword set, the electronic apparatus may determine that the corresponding keyword is a keyword other than a travel keyword. The dataset and the keyword set are updated at different intervals, and information included in the dataset may not coincide with information included in the keyword set. Here, the keyword set may correspond to a group of travel-related keywords, and the electronic apparatus may periodically update the travel-related keywords included in the keyword set.

Details of operation S230 related to a case in which the keyword is not a travel keyword will be described below with reference to FIG. 3.

In operation S240, the electronic apparatus may inquire about the number of travel search results using a travel search api. Specifically, the electronic apparatus may inquire about the number of travel search results corresponding to keyword A. That is, when keyword A in the dataset is a landing page type and is matched with a search result page, but keyword A is included in the keyword set and is confirmed as a travel keyword, the electronic apparatus may inquire about the number of travel search results using a travel search api for keyword A. Meanwhile, according to an example embodiment, the number of search results may include the number of search results confirmed using a search api.

In operation S250, the electronic apparatus may change keyword-related information on the basis of the number of travel search results as in the following example embodiment. Specifically, the electronic apparatus may check whether the number of travel search results corresponding to keyword A is 0 or 1 or more and may change keyword-related information on the basis of the results of the check.

According to an example embodiment, when the number of travel search results corresponding to keyword A is 0, the electronic apparatus may change the landing page type matched with keyword A from the search result page to the travel search result page in real time. Also, the electronic apparatus may set the state of keyword A included in the dataset to "off" in real time. When the keyword is in an off state, a related advertisement may not be provided even when a user enters the corresponding keyword into the search engine. For example, when the keyword is in an on state, the search engine may provide an advertisement that displays a link related to the keyword when the corresponding keyword is entered into the search engine. Alternatively, when the keyword is an off state, the search engine may not provide an advertisement that displays a link related to the keyword even when the corresponding keyword is entered into the search engine. That is, the dataset includes on/off information of keywords, and thus when a keyword entered by a user is included in the dataset and the corresponding keyword is in an on state, the search engine may provide an advertisement that displays a link related to the keyword, and the electronic apparatus may count the number of times the advertisement is provided and may pay a fee related to the advertisement to the search engine. Alternatively, when a keyword entered by a user is included in the dataset but the corresponding keyword is in an off state, the search engine may not provide an advertisement that displays a link related to the keyword, and the electronic apparatus may not pay a related fee to the search engine.

According to an example embodiment, when the number of travel search results corresponding to keyword A is 1 or more, the electronic apparatus may request deletion of keyword A from the dataset provided to the search engine. After a certain period of time, the electronic apparatus may match keyword A with the travel search result page rather than the search result page and register keyword A matched with the travel search result page in the dataset. For example, when a daily updated dataset is provided from the electronic apparatus to the search engine, the electronic apparatus may request that keyword A be deleted from the dataset on the previous day and may provide the dataset in which keyword A matched with the travel search result page is registered to the search engine on the next day. Therefore, from the next day, when keyword A is entered into the search engine, a screen for the travel search result page rather than the search result page may be provided to the user through keyword A.

According to an example embodiment, when the number of travel search results corresponding to keyword A is 1 or more, the electronic apparatus may change the landing page type matched with keyword A from the search result page to the travel search result page in real time. Also, the electronic apparatus may set the state of keyword A included in the dataset to "on" in real time. For example, the electronic apparatus may change the landing page type to the travel search result page in relation to keyword A in real time and may set the state of keyword A to "on." Therefore, in the dataset provided to the search engine, information related to keyword A may be changed in real time. Meanwhile, it may be understood that the information described as being provided to the search engine throughout this example embodiment is provided to one of the servers associated with the search service as well as the engine for performing the search.

Figure 3:
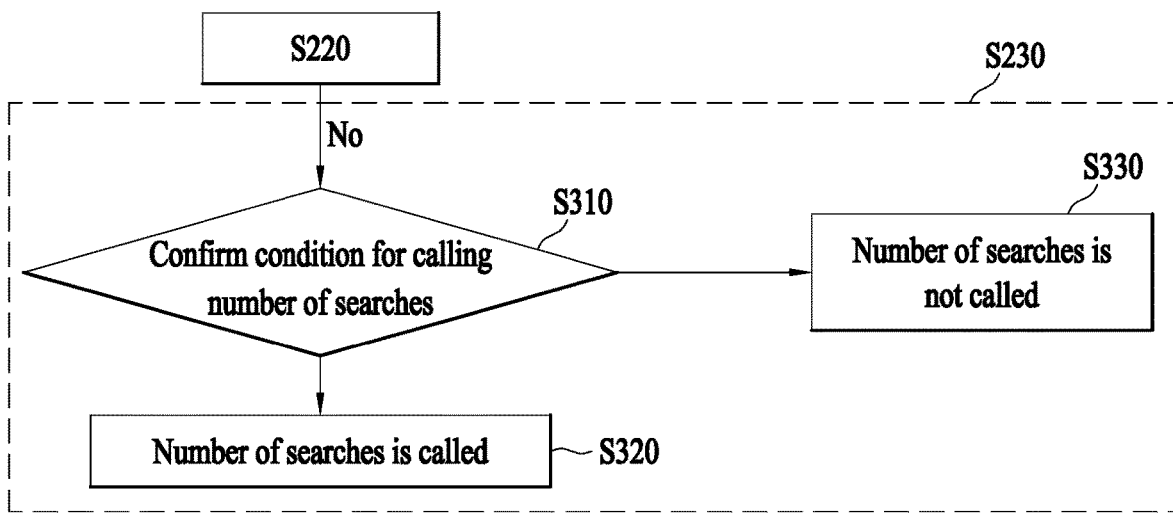
FIG. 3 shows an example embodiment of a keyword management method performed by an electronic apparatus in relation to operation S230 of FIG. 2.

FIG. 3 shows an example embodiment of a keyword management method performed by an electronic apparatus in relation to operation S230 of FIG. 2. Referring to FIG. 3, operation S230 may include the details of operations S310, S320, and S330.

In operation S310, when the keyword is not a travel keyword, the electronic apparatus may check conditions for calling the number of search results. Specifically, the electronic apparatus may check whether to call the number of search results on the basis of conditions such as 1) a case in which the total count is less than or equal to a certain number of times (e.g., 100) regardless of a keyword state, 2) a case in which a keyword state is "off," the total count exceeds a certain number, and a first period (e.g., 30 days) has passed since keyword-related information was changed, or 3) a case in which a keyword state is "on," the total count exceeds a certain number, and a second period (e.g., 7 days) has elapsed since keyword-related information was changed. Here, the keyword state indicates whether the state of the keyword is "on" or "off." A search advertisement for a keyword entered into the search engine may be provided when the keyword is "on," and a search advertisement for a keyword entered into the search engine may not be provided when the keyword is "off." Also, the total count may be information related to the total number of searches in the search engine in association with the keyword one day ago. Also, the change of the keyword-related information refers to a case in which the state of the keyword is changed to "on" or "off" or a case in which the landing page type matched with the keyword is changed. The electronic apparatus may check a period in which the related information is changed on the basis of a date on which keyword-related information is changed.

In operation S320, the electronic apparatus may call the number of search results for the keyword using a search api when a condition is satisfied. That is, the electronic apparatus may inquire about and confirm the number of search results for the keyword using a search api.

According to an example embodiment, when the number of search results is 1 or more, the electronic apparatus may maintain the landing page type of the keyword as a search result page and may set the state of the keyword to "on." For example, when the number of search results is more than 1, the electronic apparatus may maintain the landing page type of the keyword as a search result page and may set the state of the keyword to "on."

According to an example embodiment, when the number of search results is 0, the electronic apparatus may check whether the source of the corresponding keyword is a travel deal. For example, the source of the keyword may be a travel deal when the keyword is derived from a travel deal (e.g., a Hawaii hotel-related travel deal) and may not be a travel deal when the keyword is not derived from a travel deal. When the source of the keyword is a travel deal, the electronic apparatus may check whether the keyword corresponds to a black list on the basis of keyword-related information. At this time, the keyword-related information may further include category and product information in addition to the landing page type and the on/off information, and the electronic apparatus may check whether the keyword corresponds to the black list using the category and product information related to the keyword. The electronic apparatus separately sets the black list, and when the keyword-related information corresponds to the black list, the electronic apparatus may determine that a product corresponding to the keyword is invalid. Alternatively, when the keyword-related information does not correspond to the black list, the electronic apparatus may determine that a product corresponding to the keyword is valid. In this case, when the keyword-related information does not correspond to the black list, the electronic apparatus may maintain the landing page type of the keyword and may set the state of the keyword to "on." Alternatively, when the keyword-related information corresponds to the black list, the electronic apparatus may change the landing page type of the keyword to the product detail page and may set the state of the keyword to "on." Thereafter, the electronic apparatus may check whether the keyword-related product is sold out. In this case, since the number of search results is 0, the electronic apparatus may not use the number of search results. Since product information includes information regarding whether the product is sold out, the electronic apparatus may check whether the product is sold out on the basis of keyword-related product information.

According to an example embodiment, when the number of search results is 0, the electronic apparatus may check whether the source of the corresponding keyword is a travel deal. When the source of the keyword is not a travel deal, the electronic apparatus may check whether the keyword corresponds to a black list on the basis of keyword-related information. In this case, when the keyword-related information does not correspond to the black list, the electronic apparatus may determine that the product corresponding to the keyword is valid, change the landing page type of the keyword to the search detail page, and set the state of the keyword to "on." Alternatively, when the keyword-related information corresponds to the black list, the electronic apparatus may determine that the product corresponding to the keyword is invalid, maintain the landing page type of the keyword as the search result page, and set the state of the keyword to "off." Thereafter, the electronic apparatus may check whether the keyword-related product is sold out or being sold. In this case, since the number of search results is 0, the electronic apparatus may not use the number of search results. Since product information includes information regarding whether the product is sold out, the electronic apparatus may check whether the product is sold out or being sold on the basis of keyword-related product information.

In operation S330, the electronic apparatus may not call the number of search results for the keyword using search api when a condition is not satisfied. That is, the electronic apparatus may not inquire about the number of search results for the keyword using a search api. In this case, the electronic apparatus may set the state of the keyword to "on" when the total count is equal to or greater than a certain number, the keyword state is "off," and a first period has not elapsed since keyword-related information was changed. Alternatively, in other cases, the electronic apparatus may maintain keyword-related existing information.

Figure 4:
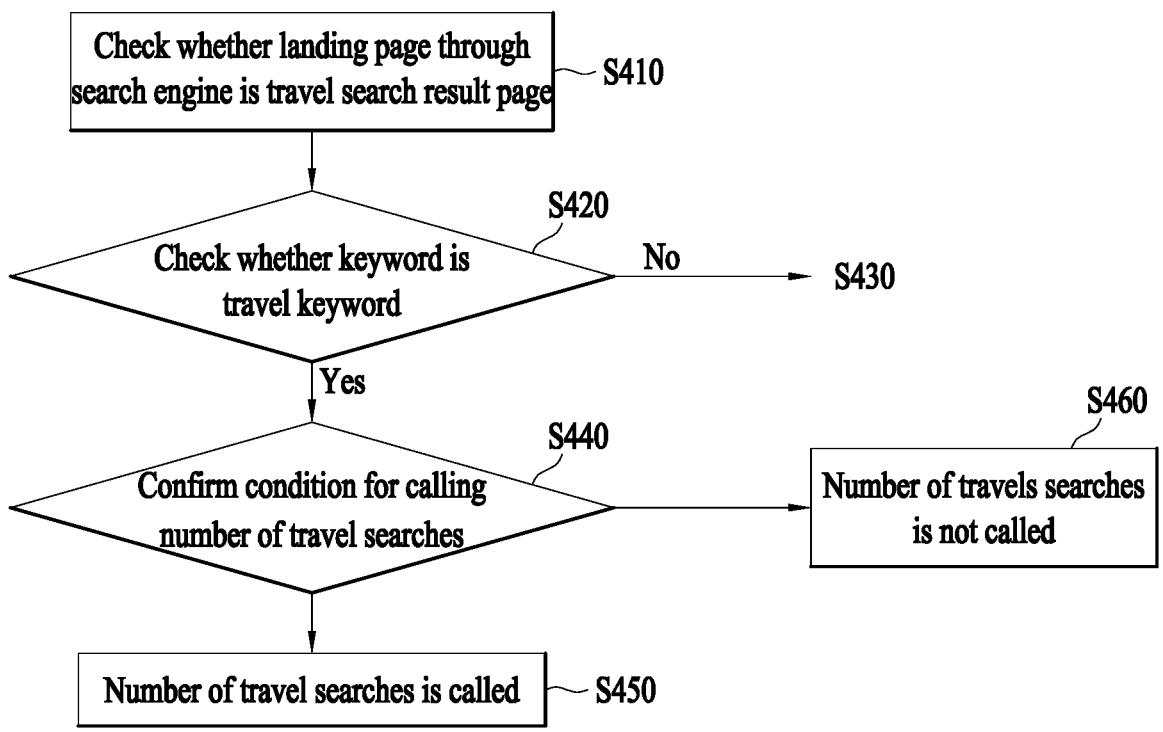
FIG. 4 shows another example embodiment of a keyword management method performed by an electronic apparatus.

FIG. 4 shows another example embodiment of a keyword management method performed by an electronic apparatus.

Referring to FIG. 4, in operation S410, the electronic apparatus may check whether a landing page through a search engine is a travel search result page (hereinafter also referred to as TSRP). The electronic apparatus may update a keyword-related dataset at regular intervals and provide the dataset to the search engine. When a word entered by a user corresponds to a keyword included in the dataset, the search engine may display a link to a landing page related to the keyword. When the user clicks on the link, the screen may be switched to a travel search result page provided by the electronic apparatus through the link. In this case, the link to the landing page related to the keyword may be displayed as a search advertisement when the keyword state is "on," and the link to the landing page related to the keyword may not be displayed as a search advertisement when the keyword state is "off." For example, when word A entered by a user corresponds to keyword A included in the dataset and the state of keyword A is "on," the search engine may display a link related to keyword A as a search advertisement. Alternatively, when word A entered by a user corresponds to keyword A included in the dataset and the state of keyword A is "off," the search engine may not display a link related to keyword A as a search advertisement. In this case, the keyword included in the dataset may be matched with a search result page or a travel search result page.

In operation S420, the electronic apparatus may check whether the keyword is a travel keyword. Specifically, the electronic apparatus may check whether the keyword included in the dataset provided to the search engine is included in a keyword set associated with the electronic apparatus. When the keyword included in the dataset is included in the keyword set, the electronic apparatus may determine that the corresponding keyword is a travel keyword. When the keyword included in the dataset is not included in the keyword set, the electronic apparatus may determine that the corresponding keyword is a keyword other than a travel keyword. The dataset and the keyword set are updated at different intervals, and information included in the dataset may not coincide with information included in the keyword set. Here, the keyword set may correspond to a group of travel-related keywords, and the electronic apparatus may periodically update the travel-related keywords included in the keyword set.

Details of operation S430 related to a case in which the keyword is not a travel keyword will be described below with reference to FIG. 5.

In operation S440, when the keyword is a travel keyword, the electronic apparatus may check conditions for calling the number of travel search results using a travel search api. Specifically, the electronic apparatus may check whether to call the number of travel search results on the basis of conditions such as 1) a case in which the total count is less than or equal to a certain number of times (e.g., 100) regardless of a keyword state, 2) a case in which a keyword state is "off," the total count exceeds a certain number, and a first period (e.g., 30 days) has elapsed since keyword-related information was changed, or 3) a case in which a keyword state is "on," the total count exceeds a certain number, and a second period (e.g., 7 days) has elapsed since keyword-related information was changed. Here, the keyword state indicates whether the state of the keyword is on or off. A search advertisement for a keyword entered into the search engine may be provided when the keyword is "on," and a search advertisement for a keyword entered into the search engine may not be provided when the keyword is "off." Also, the total count may be information related to the total number of searches in the search engine in association with the keyword one day ago. Also, the change of the keyword-related information refers to a case in which the state of the keyword is changed to "on" or "off" or a case in which the landing page type matched with the keyword is changed. The electronic apparatus may check a period in which the related information is changed on the basis of a date on which keyword-related information is changed.

In operation S450, the electronic apparatus may call the number of travel search results for the keyword when a condition is satisfied. That is, the electronic apparatus may inquire about and confirm the number of travel search results for the keyword using a travel search api. In this case, when the number of search results is 0, the electronic apparatus may maintain the landing page type of the keyword as the TSRP and may set the state of the keyword to "off." Alternatively, when the number of search results is 1 or more, the electronic apparatus may maintain the landing page type of the keyword as the TSRP and may set the state of the keyword to "on."

In operation S460, the electronic apparatus may not call the number of travel search results for the keyword when a condition is not satisfied. That is, the electronic apparatus may not inquire about the number of travel search results for the keyword using a travel search api. In this case, the electronic apparatus may set the state of the keyword to "on" when the total count is equal to or greater than a certain number, the keyword state is "off," and a first period has not elapsed since keyword-related information was changed. Alternatively, in other cases, the electronic apparatus may maintain keyword-related existing information.

Figure 5:
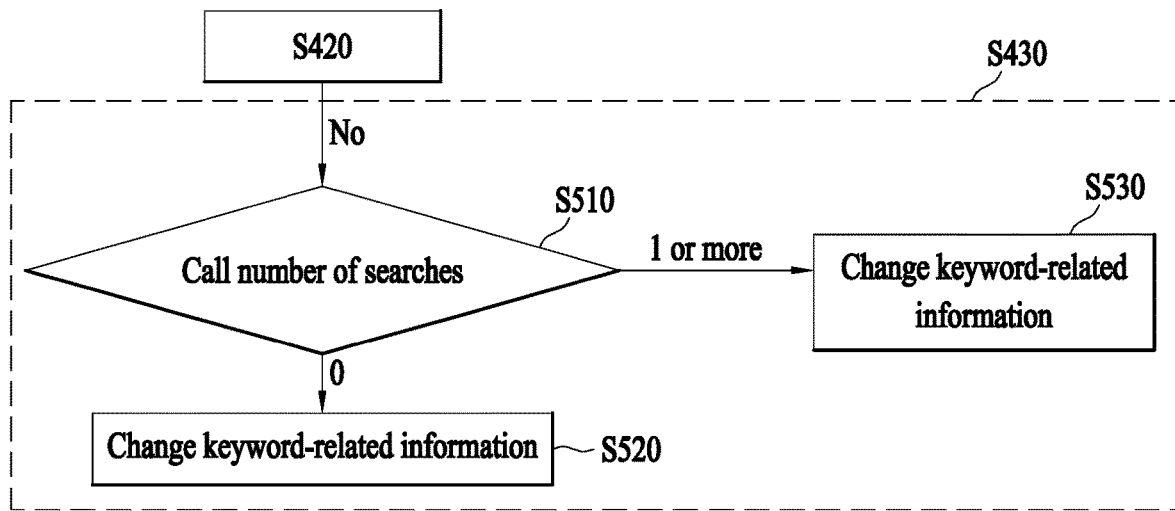
FIG. 5 shows an example embodiment of a keyword management method performed by an electronic apparatus in relation to operation S430 of FIG. 4.

FIG. 5 shows an example embodiment of a keyword management method performed by an electronic apparatus in relation to operation S430 of FIG. 4. Referring to FIG. 5, operation S430 may include the details of operations S510, S520, and S530.

In operation S510, the electronic apparatus may inquire about the number of search results using a search api. Since the keyword is not a travel keyword, the electronic apparatus may inquire about the number of search results using a search api rather than a travel search api. In this case, the keyword-related information may be changed based on the number of search results as in operations S520 and S530.

Specifically, when the number of search results is 0, the electronic apparatus may change the keyword-related information in operation S520. More specifically, the electronic apparatus may maintain the landing page type of the keyword as the TSRP and may change related information such that the state of the keyword is "off."

Alternatively, when the number of search results is 1 or more, the electronic apparatus may change the keyword-related information in operation S530. More specifically, the electronic apparatus may change the landing page type of the keyword to the SRP and may change related information such that the state of the keyword is "on."

Figure 6:
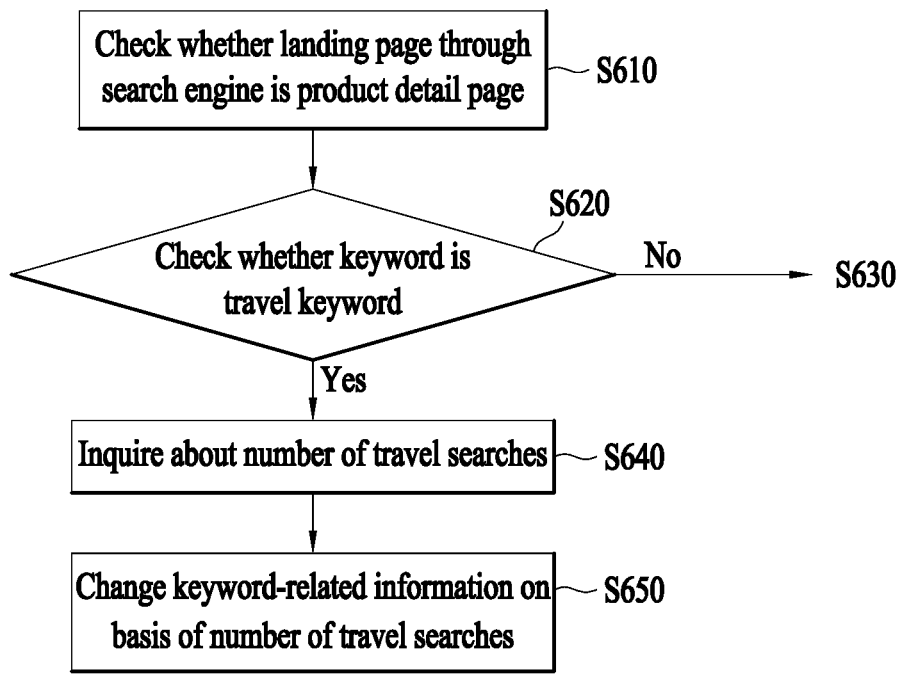
FIG. 6 shows another example embodiment of a keyword management method performed by an electronic apparatus.

FIG. 6 shows another example embodiment of a keyword management method performed by an electronic apparatus.

Referring to FIG. 6, in operation S610, the electronic apparatus may check whether a landing page through a search engine is a product detail page (hereinafter also referred to as PDP). The electronic apparatus may update a keyword-related dataset at regular intervals and provide the dataset to the search engine. When a word entered by a user corresponds to a keyword included in the dataset, the search engine may display a link to a landing page related to the keyword. When the user clicks on the link, the screen may be switched to a product detail page provided by the electronic apparatus through the link. Here, the product detail page may be a page including detailed information related to a product corresponding to the keyword entered into the search engine. In contrast, the search result page may be a page including the number of search results corresponding to the keyword and brief search information.

In this case, the link to the landing page related to the keyword may be displayed as a search advertisement when the keyword state is "on," and the link to the landing page related to the keyword may not be displayed as a search advertisement when the keyword state is "off." For example, when word A entered by a user corresponds to keyword A included in the dataset and the state of keyword A is "on," the search engine may display a link related to keyword A as a search advertisement. Alternatively, when word A entered by a user corresponds to keyword A included in the dataset and the state of keyword A is "off," the search engine may not display a link related to keyword A as a search advertisement. In this case, the keyword included in the dataset may be matched with a product detail page, a search result page, or a travel search result page as a landing page type. Here, landing page types may be pages having different domains.

In operation S620, the electronic apparatus may check whether the keyword is a travel keyword. Specifically, the electronic apparatus may check whether the keyword included in the dataset provided to the search engine is included in a keyword set associated with the electronic apparatus. When the keyword included in the dataset is included in the keyword set, the electronic apparatus may determine that the corresponding keyword is a travel keyword. When the keyword included in the dataset is not included in the keyword set, the electronic apparatus may determine that the corresponding keyword is a keyword other than a travel keyword. The dataset and the keyword set are updated at different intervals, and information included in the dataset may not coincide with information included in the keyword set. Here, the keyword set may correspond to a group of travel-related keywords, and the electronic apparatus may periodically update the travel-related keywords included in the keyword set.

Details of operation S630 related to a case in which the keyword is not a travel keyword will be described below with reference to FIG. 7.

In operation S640, the electronic apparatus may inquire about the number of travel search results using a travel search api. Specifically, the electronic apparatus may inquire about the number of travel search results corresponding to keyword A. That is, when keyword A is included in the keyword set and is confirmed as a travel keyword, the electronic apparatus may inquire about the number of travel search results using a travel search api for keyword A.

In operation S650, the electronic apparatus may change keyword-related information on the basis of the number of travel search results as in the following example embodiment. Specifically, the electronic apparatus may check whether the number of travel search results corresponding to keyword A is 0 or 1 or more and may change keyword-related information on the basis of the results of the check.

According to an example embodiment, when the number of travel search results corresponding to keyword A is 0, the electronic apparatus may request deletion of keyword A from the dataset provided to the search engine. After a certain period of time, the electronic apparatus may match keyword A with the travel search result page rather than the product detail page and register keyword A matched with the travel search result page in the dataset. For example, when a daily updated dataset is provided from the electronic apparatus to the search engine, the electronic apparatus may request that keyword A be deleted from the dataset on the previous day and may provide the dataset in which keyword A matched with the travel search result page is registered to the search engine on the next day. Therefore, from the next day, when keyword A is entered into the search engine, a screen for the travel search result page rather than the product detail page may be provided to the user through keyword A.

According to an example embodiment, when the number of travel search results corresponding to keyword A is 0, the electronic apparatus may change the landing page type matched with keyword A from the product detail page to the travel search result page in real time. Also, the electronic apparatus may set the state of keyword A included in the dataset to "off" in real time. When the keyword is in an off state, a related advertisement may not be provided even when a user enters the corresponding keyword into the search engine. For example, when the keyword is in an on state, the search engine may provide an advertisement that displays a link related to the keyword when the corresponding keyword is entered into the search engine. Alternatively, when the keyword is an off state, the search engine may not provide an advertisement that displays a link related to the keyword even when the corresponding keyword is entered into the search engine. That is, the dataset includes on/off information of keywords, and thus when a keyword entered by a user is included in the dataset and the corresponding keyword is in an on state, the search engine may provide an advertisement that displays a link related to the keyword, and the electronic apparatus may count the number of times the advertisement is provided and may pay a fee related to the advertisement to the search engine. Alternatively, when a keyword entered by a user is included in the dataset but the corresponding keyword is in an off state, the search engine may not provide an advertisement that displays a link related to the keyword, and the electronic apparatus may not pay a related fee to the search engine.

According to an example embodiment, when the number of travel search results corresponding to keyword A is 1 or more, the electronic apparatus may request deletion of keyword A from the dataset provided to the search engine. After a certain period of time, the electronic apparatus may match keyword A with the travel search result page rather than the product detail page and register keyword A matched with the travel search result page in the dataset. For example, when a daily updated dataset is provided from the electronic apparatus to the search engine, the electronic apparatus may request that keyword A be deleted from the dataset on the previous day and may provide the dataset in which keyword A matched with the travel search result page is registered to the search engine on the next day. Therefore, from the next day, when keyword A is entered into the search engine, a screen for the travel search result page rather than the product detail page may be provided to the user through keyword A.

According to an example embodiment, when the number of travel search results corresponding to keyword A is 1 or more, the electronic apparatus may change the landing page type matched with keyword A from the product detail page to the travel search result page in real time. Also, the electronic apparatus may set the state of keyword A included in the dataset to "on" in real time. For example, the electronic apparatus may change the landing page type to the travel search result page in relation to keyword A in real time and may set the state of keyword A to "on." Therefore, in the dataset provided to the search engine, information related to keyword A may be changed in real time.

Figure 7:
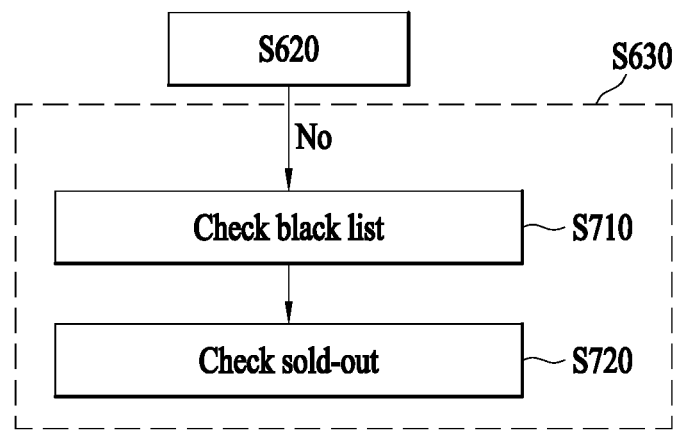
FIG. 7 shows an example embodiment of a keyword management method performed by an electronic apparatus in relation to operation S630 of FIG. 6.

FIG. 7 shows an example embodiment of a keyword management method performed by an electronic apparatus in relation to operation S630 of FIG. 6. Referring to FIG. 7, operation S630 may include the details of operations S710 and S720.

In operation S710, the electronic apparatus may check whether a keyword corresponds to a black list on the basis of keyword-related information. Also, in operation S720, the electronic apparatus may check whether a product is sold out.

The keyword-related information may further include category and product information in addition to the landing page type and the on/off information, and the electronic apparatus may check whether the keyword corresponds to the black list using the category and product information related to the keyword. The electronic apparatus separately sets the black list, and when the keyword-related information corresponds to the black list, the electronic apparatus may determine that a product corresponding to the keyword is invalid. Alternatively, when the keyword-related information does not correspond to the black list, the electronic apparatus may determine that a product corresponding to the keyword is valid.

In this case, when the keyword-related information does not correspond to the black list, the electronic apparatus may maintain the landing page type of the keyword and set the state of the keyword to "on." Alternatively, when the keyword-related information corresponds to the black list, the electronic apparatus may inquire about the number of search results. When the number of search results is 0, the electronic apparatus may maintain the landing page type of the keyword and may set the state of the keyword to "off." Alternatively, when the number of search results is 1 or more, the electronic apparatus may change the landing page type of the keyword to the search result page and may set the state of the keyword to "on."

Figure 8:
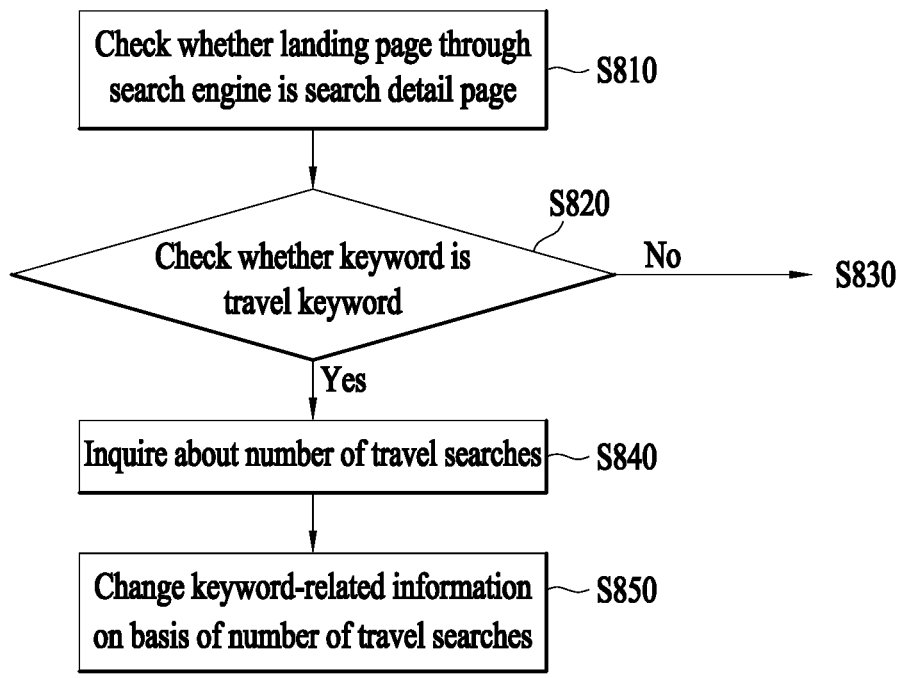
FIG. 8 shows another example embodiment of a keyword management method performed by an electronic apparatus.

FIG. 8 shows another example embodiment of a keyword management method performed by an electronic apparatus.

Referring to FIG. 8, in operation S810, the electronic apparatus may check whether a landing page through a search engine is a search detail page (hereinafter also referred to as SDP). The electronic apparatus may update a keyword-related dataset at regular intervals and provide the dataset to the search engine. When a word entered by a user corresponds to a keyword included in the dataset, the search engine may display a link to a landing page related to the keyword. When the user clicks on the link, the screen may be switched to a search detail page provided by the electronic apparatus through the link. In this case, the link to the landing page related to the keyword may be displayed as a search advertisement when the keyword state is "on," and the link to the landing page related to the keyword may not be displayed as a search advertisement when the keyword state is "off." For example, when word A entered by a user corresponds to keyword A included in the dataset and the state of keyword A is "on," the search engine may display a link related to keyword A as a search advertisement. Alternatively, when word A entered by a user corresponds to keyword A included in the dataset and the state of keyword A is "off," the search engine may not display a link related to keyword A as a search advertisement. In this case, the keyword included in the dataset may be matched with a search detail page, a search result page, or a travel search result page as a landing page type. Here, landing page types may be pages having different domains.

In operation S820, the electronic apparatus may check whether the keyword is a travel keyword. Specifically, the electronic apparatus may check whether the keyword included in the dataset provided to the search engine is included in a keyword set associated with the electronic apparatus. When the keyword included in the dataset is included in the keyword set, the electronic apparatus may determine that the corresponding keyword is a travel keyword. When the keyword included in the dataset is not included in the keyword set, the electronic apparatus may determine that the corresponding keyword is a keyword other than a travel keyword. The dataset and the keyword set are updated at different intervals, and information included in the dataset may not coincide with information included in the keyword set. Here, the keyword set may correspond to a group of travel-related keywords, and the electronic apparatus may periodically update the travel-related keywords included in the keyword set.

Details of operation S830 related to a case in which the keyword is not a travel keyword will be described below with reference to FIG. 9.

In operation S840, the electronic apparatus may inquire about the number of travel search results using a travel search api. Specifically, the electronic apparatus may inquire about the number of travel search results corresponding to keyword A. That is, when keyword A is included in the keyword set and is confirmed as a travel keyword, the electronic apparatus may inquire about the number of travel search results using a travel search api for keyword A.

In operation S850, the electronic apparatus may change keyword-related information on the basis of the number of travel search results as in the following example embodiment. Specifically, the electronic apparatus may check whether the number of travel search results corresponding to keyword A is 0 or 1 or more and may change keyword-related information on the basis of the results of the check.

According to an example embodiment, when the number of travel search results corresponding to keyword A is 0, the electronic apparatus may request deletion of keyword A from the dataset provided to the search engine. After a certain period of time, the electronic apparatus may match keyword A with the travel search result page rather than the product detail page and register keyword A matched with the travel search result page in the dataset. For example, when a daily updated dataset is provided from the electronic apparatus to the search engine, the electronic apparatus may request that keyword A be deleted from the dataset on the previous day and may provide the dataset in which keyword A matched with the travel search result page is registered to the search engine on the next day. Therefore, from the next day, when keyword A is entered into the search engine, a screen for the travel search result page rather than the search detail page may be provided to the user through keyword A.

According to an example embodiment, when the number of travel search results corresponding to keyword A is 0, the electronic apparatus may change the landing page type matched with keyword A from the search detail page to the travel search result page in real time. Also, the electronic apparatus may set the state of keyword A included in the dataset to "off" in real time. When the keyword is in an off state, a related advertisement may not be provided even when a user enters the corresponding keyword into the search engine. For example, when the keyword is in an on state, the search engine may provide an advertisement that displays a link related to the keyword when the corresponding keyword is entered into the search engine. Alternatively, when the keyword is an off state, the search engine may not provide an advertisement that displays a link related to the keyword even when the corresponding keyword is entered into the search engine. That is, the dataset includes on/off information of keywords, and thus when a keyword entered by a user is included in the dataset and the corresponding keyword is in an on state, the search engine may provide an advertisement that displays a link related to the keyword, and the electronic apparatus may count the number of times the advertisement is provided and may pay a fee related to the advertisement to the search engine. Alternatively, when a keyword entered by a user is included in the dataset but the corresponding keyword is in an off state, the search engine may not provide an advertisement that displays a link related to the keyword, and the electronic apparatus may not pay a related fee to the search engine.

According to an example embodiment, when the number of travel search results corresponding to keyword A is 1 or more, the electronic apparatus may request deletion of keyword A from the dataset provided to the search engine. After a certain period of time, the electronic apparatus may match keyword A with the travel search result page rather than the search detail page and register keyword A matched with the travel search result page in the dataset. For example, when a daily updated dataset is provided from the electronic apparatus to the search engine, the electronic apparatus may request that keyword A be deleted from the dataset on the previous day and may provide the dataset in which keyword A matched with the travel search result page is registered to the search engine on the next day. Therefore, from the next day, when keyword A is entered into the search engine, a screen for the travel search result page rather than the search detail page may be provided to the user through keyword A.

According to an example embodiment, when the number of travel search results corresponding to keyword A is 1 or more, the electronic apparatus may change the landing page type matched with keyword A from the search detail page to the travel search result page. Also, the electronic apparatus may set the state of keyword A included in the dataset to "on" in real time. For example, the electronic apparatus may change the landing page type to the travel search result page in relation to keyword A in real time and may set the state of keyword A to "on." Therefore, in the dataset provided to the search engine, information related to keyword A may be changed in real time.

Figure 9:
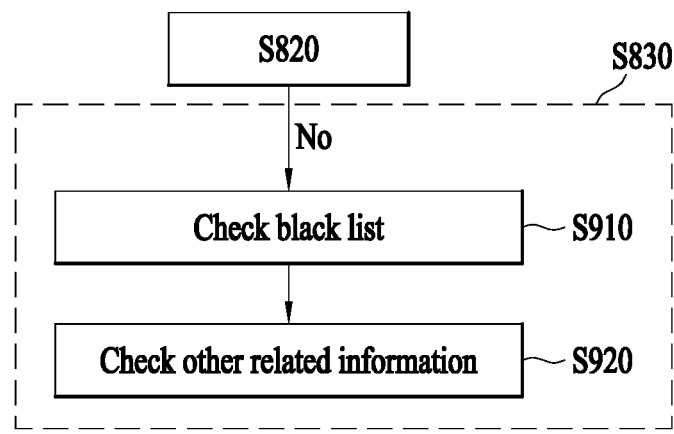
FIG. 9 shows an example embodiment of a keyword management method performed by an electronic apparatus in relation to operation S830 of FIG. 8.

FIG. 9 shows an example embodiment of a keyword management method performed by an electronic apparatus in relation to operation S830 of FIG. 8. Referring to FIG. 9, operation S830 may include the details of operations S910 and S920.

In operation S910, the electronic apparatus may check whether a keyword corresponds to a black list on the basis of keyword-related information. Also, in operation S920, the electronic apparatus may check other related information. Specifically, in operation S920, the electronic apparatus may check whether a product is sold out or being sold.

The keyword-related information may further include category and product information in addition to the landing page type and the on/off information, and the electronic apparatus may check whether the keyword corresponds to the black list using the category and product information related to the keyword. The electronic apparatus separately sets the black list, and when the keyword-related information corresponds to the black list, the electronic apparatus may determine that a product corresponding to the keyword is invalid. Alternatively, when the keyword-related information does not correspond to the black list, the electronic apparatus may determine that a product corresponding to the keyword is valid.

In this case, when the keyword-related information does not correspond to the black list, the electronic apparatus may maintain the landing page type of the keyword and set the state of the keyword to "on." Alternatively, when the keyword-related information corresponds to the black list, the electronic apparatus may inquire about the number of search results. When the number of search results is 0, the electronic apparatus may maintain the landing page type of the keyword and may set the state of the keyword to "off." Alternatively, when the number of search results is 1 or more, the electronic apparatus may change the landing page type of the keyword to the search result page and may set the state of the keyword to "on."

Figure 10:
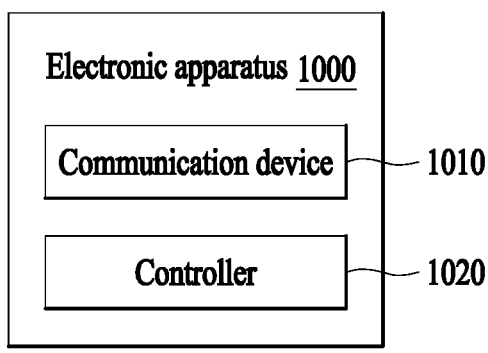
FIG. 10 shows a block diagram of an electronic apparatus according to an example embodiment.

FIG. 10 shows a block diagram of an electronic apparatus according to an example embodiment.

According to an example embodiment, an electronic apparatus 1000 may include a communication device 1010 and a controller 1020. In the electronic apparatus 1000 shown in FIG. 10, only elements related to this example embodiment are shown. Therefore, it can be understood by those skilled in the art that general-purpose elements other than the elements shown in FIG. 10 may be further included. The above description of the electronic apparatus is applicable to the electronic apparatus 1000, and thus a redundant description thereof will be omitted.

The communication device 1010, which is an apparatus for performing wired/wireless communication, may communicate with a search engine implemented in another apparatus. Also, communication technology used by the communication device 1010 may include Global System for Mobile communication (GSM), Code Division Multi-Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like. In an example embodiment, the communication device 1010 may be referred to as a transceiver, and the electronic apparatus 1000 may exchange information with the search engine through the transceiver.

The controller 1020 may control the overall operation of the electronic apparatus 1000 and process data and signals. The controller 1020 may include at least one hardware unit. Also, the controller 1020 may be operated by one or more software modules that are generated by executing program code stored in a memory. The controller 1020 may include a processor and a memory. The processor may execute program code stored in the memory, control the overall operation of the electronic apparatus 1000, and process data and signals. Also, according to an example embodiment, the controller 1020 may include at least one processor.

The controller 1020 may determine information related to a dataset and may provide the dataset to the search engine using the communication device 1010. Also, the controller 1020 may set a keyword set separate from the dataset, check whether a word entered by a user into the search engine corresponds to the keyword set, and determine whether the word is a travel keyword. Specifically, when the word corresponds to a travel keyword, the controller 1020 may set keyword-related information such that a landing page type preset in the dataset is changed. Alternatively, even when the word does not correspond to a travel keyword, the controller 1020 may check the number of search results, a black list, whether a product is sold out, or the like and may perform setting such that the keyword-related information is changed. Accordingly, a service including information more suitable for a keyword used by a user to search may be provided, and thus it is possible to improve the user's purchasing power.

Meanwhile, a case in which a landing page type varies depending on whether a word is a travel keyword in the above example embodiments has been described, but the present disclosure is not limited thereto. In order to provide a link from an external service to a service page provided by an electronic apparatus, the type of keyword may be set differently depending on a service condition related to the electronic apparatus. The type of landing page may be distinguished between pages of different categories of the same domain or may be distinguished between different domain pages.

According to the above-described example embodiments, an electronic apparatus or a terminal may include a processor, a memory configured to store and execute program data, a permanent storage such as a disk drive, a communication port configured to communicate with an external apparatus, a user interface device such as a touch panel, a key, and a button, and the like. Methods implemented using software modules or algorithms may be stored on a computer-readable recording medium as computer-readable code or program instructions executable on the processor. Here, the computer-readable recording medium may include a magnetic storage medium (e.g., ROM, RAM, floppy disk, hard disk, etc.), an optical reading medium (e.g., CD-ROM, digital versatile disc (DVD), etc.), and the like. The computer-readable recording medium may be distributed over network-coupled computer systems so that the computer-readable code is stored and executed in a distributed fashion. The medium is readable by a computer, stored in a memory, and executed on a processor.

This example embodiment may be described in terms of functional block components and various processing operations. The functional blocks may be realized by various numbers of hardware and/or software components configured to perform specific functions. For example, this example embodiment may employ integrated circuit elements, such as a memory, processing, logic, and a look-up table, for executing various functions by the control of one or more microprocessors or other control apparatuses. Similarly to the elements being executable with software programming or software elements, this example embodiment may be implemented with a programming or scripting language, such as C, C++, Java, and an assembler, including various algorithms implemented with a combination of data structures, processes, routines or other programming elements. Functional aspects may be implemented with an algorithm executed by one or more processors. Furthermore, this example embodiment may employ any number of related art techniques for electronics configuration, signal processing, data processing, and the like. The terms "mechanism," "element," "means," and "configuration" may be widely used and are not limited to mechanical and physical configurations. The terms may include a meaning of a series of routines of software in association with a processor.

The above-described example embodiments are only examples, and other example embodiments may be implemented within the scope of the claims, which will be described below.

What is claimed is:

1. A keyword management method of an electronic apparatus related to a service providing a landing page of a landing page type, the keyword management method comprising:
- receiving, by a first electronic apparatus and from a search service hosted by a second electronic apparatus, a keyword and a first landing page type, wherein the keyword is included in a dataset provided from the first electronic apparatus to the second electronic apparatus;
- determining whether the keyword corresponds to a first keyword set, wherein the first keyword set is related to a hospitality industry and a second keyword set is related to products;
- determining, based on a determination that the keyword corresponds to the first keyword set, whether the first landing page type corresponds to a landing page type associated with the first keyword set;
- changing, based on the determination that the first landing page type does not correspond to a landing page type associated with the first keyword set, the first landing page type to a second landing page type, wherein the second landing page type is associated with the first keyword set; wherein the changing of the landing page type corresponding to the keyword comprises:
  - deleting information corresponding to the keyword from the dataset when a number of search results of the keyword for the second landing page type related to the second keyword set in the search service is 1 or more; and
  - matching the keyword with the second landing page type related to the second keyword set and registering the keyword matched with the second landing page type in the dataset; and
- sending, to the second electronic apparatus and based on changing the first landing page type to the second landing page type, information on the second landing page type,
- wherein the first landing page type corresponds to an item search result page, and
- wherein the second landing page type corresponds to a travel search result page.

2. The keyword management method of claim 1, wherein the changing of the landing page type comprises changing the first landing page type related to the keyword from the first landing page type to the second landing page type when the first landing page type corresponding to the keyword confirmed based on the dataset is the first landing page type.

3. The keyword management method of claim 1, wherein a page corresponding to the second landing page type has a different domain from that of a page corresponding to the first landing page type.

4. The keyword management method of claim 1, wherein the determining of whether the keyword corresponds to the first keyword set comprises determining whether the keyword is included in the first keyword set.

5. The keyword management method of claim 1, wherein the changing of the first landing page type comprises changing information related to the keyword included in the dataset based on a number of search results of the keyword for the second landing page type related to the first keyword set in the search service.

6. The keyword management method of claim 5, wherein changing information related to the keyword comprises setting a state of the keyword included in the dataset to "off" when the number of search results is 0, and when the state of the keyword is set to "off," exposure of a search result for the search service corresponding to the keyword is omitted in a second search service of the second electronic apparatus.

7. The keyword management method of claim 1, wherein the changing of the landing page type corresponding to the keyword comprises changing the first landing page type matched with the keyword in the dataset from the first landing page type to the second landing page type and setting a state of the keyword to "on" when a number of search results of the keyword for the second landing page type related to the keyword set in the search service is 1 or more, and
- when the state of the keyword is set to "on," a search result for the search service corresponding to the keyword is exposed in a second search service of the second electronic apparatus.

8. The keyword management method of claim 1, wherein the dataset and the keyword set related to the electronic apparatus are updated at different intervals.

9. The keyword management method of claim 1, wherein the second keyword set corresponds to a set of keywords related to travel products.

10. The keyword management method of claim 1, further comprising:
- determining whether to inquire about a number of search results of an item corresponding to the keyword in the search service based on a preset condition when the keyword does not correspond to the first keyword set; and
- updating information related to the dataset based on the number of search results when the number of search results is inquired about.

11. The keyword management method of claim 8, wherein the updating comprises updating a state of the keyword and the second landing page type by checking a black list and whether a product is sold out based on the keyword when the number of search results is 0.

12. A non-transitory computer-readable recording medium having a program recorded thereon for a computer to execute the keyword management method of claim 1.

13. An electronic apparatus comprising:
- a communication device; and
- a controller, comprising one or more processors and memory storing instructions that, when executed by the one or more processors, cause the controller to:
  - receive a keyword associated with a search service of a second electronic apparatus, wherein the keyword is included in a dataset provided from a first electronic apparatus to the second electronic apparatus;
  - receive a first landing page type, wherein the first landing page type corresponds to an item search result page, and wherein a second landing page type corresponds to a travel search result page;
  - determine, based on the keyword, whether the keyword corresponds to one of a first keyword set or a second keyword set, wherein the first keyword set is related to a hospitality industry and the second keyword set is related to products;
  - determine, based on a determination that the keyword corresponds to the first keyword set, whether the first landing page type corresponds to a landing page type associated with the first keyword set; and
  - change, based on a determination that the first landing page type does not correspond to a landing page type associated with the first keyword set, the first landing page type to a second landing page type, wherein the second landing page type corresponds to a landing page type associated with the first keyword set,
wherein the changing of the landing page type corresponding to the keyword comprises:
deleting information corresponding to the keyword from the dataset when a number of search results of the keyword for the second landing page type related to the second keyword set in the search service is 1 or more, and
matching the keyword with the second landing page type related to the second keyword set and registering the keyword matched with the second landing page type in the dataset.

* * * * *